US008472283B2

(12) United States Patent
Fischer

(10) Patent No.: US 8,472,283 B2
(45) Date of Patent: Jun. 25, 2013

(54) CLOCK SYNCHRONIZATION

(76) Inventors: Laurence Fischer, Wrightstown, PA (US); Jeremy Laurence Fischer, legal representative, Wrightstown, PA (US)

( * ) Notice: Subject to any disclaimer, the term of this patent is extended or adjusted under 35 U.S.C. 154(b) by 347 days.

(21) Appl. No.: 12/897,894

(22) Filed: Oct. 5, 2010

(65) Prior Publication Data

US 2012/0082173 A1 Apr. 5, 2012

(51) Int. Cl.
*G04C 11/00* (2006.01)
(52) U.S. Cl.
USPC ............................................. 368/46
(58) Field of Classification Search
USPC . 368/46, 156–157, 200–202, 47; 342/357.02, 342/357.15; 331/46, 47, 116, 176; 395/555; 1/46, 156–157, 200–202
See application file for complete search history.

(56) References Cited

U.S. PATENT DOCUMENTS

| | | | |
|---|---|---|---|
| 5,677,895 A | 10/1997 | Mankovitz | |
| 6,223,050 B1 | 4/2001 | Roberts, Jr. | |
| 6,269,055 B1 | 7/2001 | Pikula et al. | |
| 6,304,518 B1 | 10/2001 | O'Neill | |
| 6,873,573 B2 | 3/2005 | Pikula et al. | |
| 7,120,092 B2 | 10/2006 | Del Prado Pavon et al. | |
| 7,369,462 B2 | 5/2008 | Abbott et al. | |
| 7,394,726 B2 | 7/2008 | O'Neill et al. | |
| 7,411,869 B2 | 8/2008 | Pikula et al. | |
| 7,447,931 B1 | 11/2008 | Rischar et al. | |
| 7,457,200 B2 | 11/2008 | Pikula et al. | |
| 7,480,210 B2 | 1/2009 | Pikula et al. | |
| 7,499,379 B2 | 3/2009 | Pikula et al. | |
| 7,522,688 B2 | 4/2009 | Shemesh et al. | |
| 7,539,085 B2 | 5/2009 | Pikula et al. | |
| 7,715,279 B2 * | 5/2010 | Urano et al. | 368/47 |
| 7,813,225 B2 * | 10/2010 | Urano | 368/47 |
| 8,264,914 B2 * | 9/2012 | Baba | 368/47 |
| 2006/0238415 A1 * | 10/2006 | Gilkes | 342/357.02 |
| 2009/0028006 A1 * | 1/2009 | Ha et al. | 368/46 |

* cited by examiner

*Primary Examiner* — Edwin A. Leon
(74) *Attorney, Agent, or Firm* — Howson & Howson LLP

(57) ABSTRACT

In a clock synchronization system, clocks on a local area network are synchronized to a standard time signal such as the Network Time Protocol (NTP) signal or the Global Positioning System (GPS) time signal. A terminal on the network enables a user to introduce an offset to the clocks individually so that clocks can display the time in different time zones.

12 Claims, 3 Drawing Sheets

| 2 | 5 | 8 | 16 | 24 | 32 BIT |
|---|---|---|---|---|---|
| LI | VN | MODE | STRATUM | POLL | PRECISION |
| ROOT DELAY ||||||
| ROOT DISPERSION ||||||
| REFERENCE IDENTIFIER ||||||
| REFERENCE TIMESTAMP (64) ||||||
| ORIGINATE TIMESTAMP (64) ||||||
| RECEIVE TIMESTAMP (64) ||||||
| TRANSMIT TIMESTAMP (64) ||||||
| KEY IDENTIFIER (OPTIONAL) (32) ||||||
| MESSAGE DIGEST (OPTIONAL) (128) ||||||

FIG. 5

CLOCK SYNCHRONIZATION

FIELD OF THE INVENTION

This invention relates to time signal-synchronized clocks, and more particularly to a new clock synchronization system in which time signal information used for clock synchronization is transmitted to one or more clocks by means of a local area network for improved reliability and versatility.

BACKGROUND OF THE INVENTION

In a conventional time signal-synchronized analog clock, sometimes referred to as an "atomic clock," a clock movement is kept in synchronization with a standard time signal broadcast by radio from a remote transmitting station. In the clock, the hand positions are determined by a hand position detector, usually an optical system in which the 12:00:00 position of the hour, minute and second hands is determined by detecting the alignment of three holes in the drive gearing with a fixed fourth hole, one hole corresponding to each hand. The hand positions are compared electronically with time information, referred to as a "time stamp," derived from the broadcast time signal. A motor driver that operates two clock motors, one operating the second hand, and the other operating the minute and hour hands, periodically effects an appropriate retarding or advancing movement of the hands in response to the comparison between the hand position information and the time stamp.

The broadcast time signal usually used is a so-called "DCF" signal having a carrier frequency of 77.5 kHz. The amplitude of the signal is reduced by 25% at the beginning of each second except for the 59th second. The duration of the reduction in amplitude is utilized to convey information. An amplitude reduction over an interval of 200 milliseconds (ms) can be interpreted as a logical "high" and an amplitude reduction over an interval of 100 ms can be interpreted as a logical "low". Thus, over an interval of one minute, sixty bits of information can be transmitted. The information transmitted each minute as binary data can include the calendar year, month, day, hour, and minute as well as time zone information, time changes from daylight to standard or from standard to daylight, astronomical time corrections ("leap seconds"), parity checks, and other miscellaneous information. FIG. 1 is a schematic diagram of a typical conventional time signal-synchronized clock. The clock comprises a clock movement 20, a motor driver 22, a radio receiver 24, a clock hand position detector 26, and a processor 28 for decoding the received radio signal to produce a time stamp, comparing the time stamp to the detected clock hand position, and sending an adjustment command to the motor driver 22. The unit is powered by a 1.5 volt "AA" electrochemical cell 30.

FIG. 2 illustrates the combined amplitude and pulse-width modulation of the carrier, and the logical bit information derived therefrom. FIG. 3 illustrates the portion of the encoded information corresponding to minutes and hours.

The conventional time-signal-synchronized clock operates satisfactorily in locations where the broadcast time signal is sufficiently strong. The conventional system, however, also depends on the reception of radio signals transmitted over hundreds or even thousands of miles. Because these signals are weak at the point of reception, satisfactory reception is highly dependent on position, antenna orientation, terrain, the proximity of shielding materials such as metal objects, and weather conditions, and even time of day. In some localities remote from the transmitting antenna, and in underground locations and other locations where the receiver is shielded, the received signal may be too weak to provide reliable time synchronization.

In addition, in the case of conventional time signal-synchronized clocks, it is difficult to set each one of a set of clocks to a different time zone, and difficult to set different clocks to receive time signals from different sources. Some conventional "atomic" clocks in the United States include a time zone switch enabling the user to select, Eastern, Central, Mountain, or Pacific time, but cannot easily be set to display time in other time zones.

SUMMARY OF THE INVENTION

The clock synchronization system of the invention comprises a local area network, a receiver for receiving a publicly available standard time signal, a first network interface associated with the receiver for transmitting time information over the local area network, a clock for displaying time, and a second network interface associated with the clock and in communication with the local area network. The system also comprises means connected to the second network interface for generating a time stamp based on time information transmitted over the local area network, and means, responsive to the time stamp and to the time displayed on the clock, for comparing the displayed time with the time stamp and adjusting the displayed time so that the displayed time is synchronized with the standard time signal. Because the time information is transmitted over a local area network, the synchronization system can be made more reliable than a system that depends on the reception of radio signals transmitted over many miles. The receiver can be connected to a public wide area network so that it receives a publicly available standard time signal from a source connected to the public wide area network. Alternatively, the receiver can be tuned to receive a publicly available standard time signal transmitted by a global positioning system satellite. The local area network can be a wireless local area network. Alternatively, the system can be a wired network. Advantageously, in the case of a building or other facility having an area such as a basement that is shielded or otherwise too remote from a wireless router for reliable communication, a hybrid wired and wireless network can be utilized, with the remote clocks connected through interfaces to the wired portion of the network, and other clocks connected to the network through wireless links.

Some of the advantages of the invention become more significant in an embodiment in which plural clocks are connected to the local area network. In such a system, each additional clock is associated with an additional network interface in communication with the local area network. Means associated with each additional clock and connected to the additional network interface associated therewith generate a time stamp based on time information transmitted over the local area network. Means associated with each additional clock and responsive to the time stamp generated by the time stamp-generating means associated therewith and to the time displayed thereon, compare the displayed time with the last-mentioned time stamp and adjust the displayed time so that the displayed time corresponds with the standard time signal.

In a plural clock embodiment, a user interface terminal in communication with the network through still another network interface, can be programmed to allow a user to adjust the hours displayed on the clocks independently. The clocks can then display the time in different time zones, each selected by the user.

BRIEF DESCRIPTION OF THE DRAWINGS

FIG. 5 is a block diagram showing the NTP (Network Time Protocol).

DETAILED DESCRIPTION OF THE PREFERRED EMBODIMENT

Figure 1:
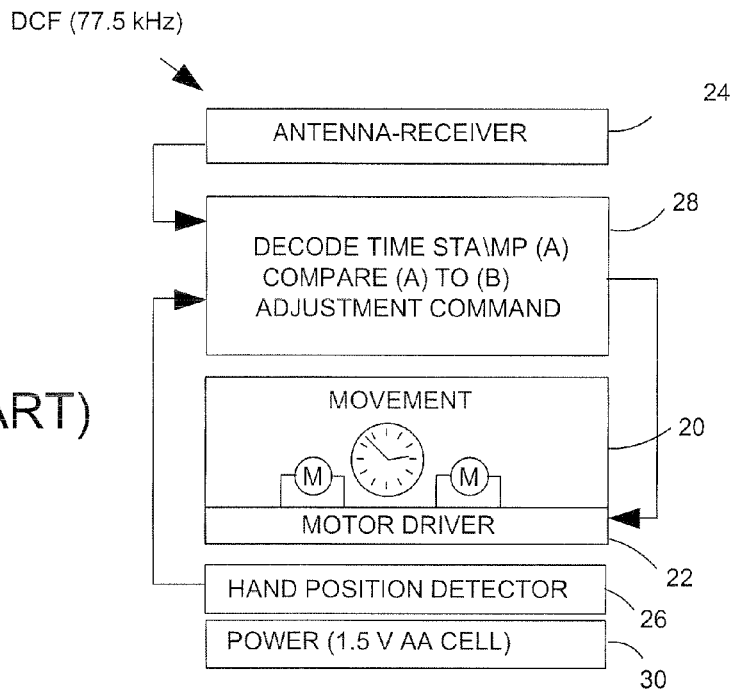
FIG. 1 is a schematic diagram of a typical conventional time signal-synchronized clock.
Figure 2:
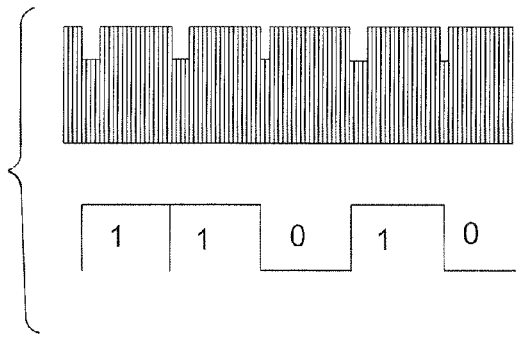
FIG. 2 illustrates the combined amplitude and pulse-width modulation of the carrier, and the logical bit information derived therefrom in the conventional time signal-synchronized clock.
Figure 3:
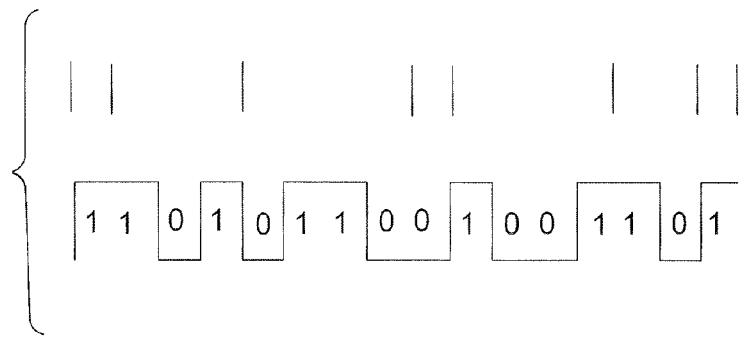
FIG. 3 illustrates the portion of the encoded information corresponding to minutes and hours in the conventional time signal-synchronized clock.
Figure 4:
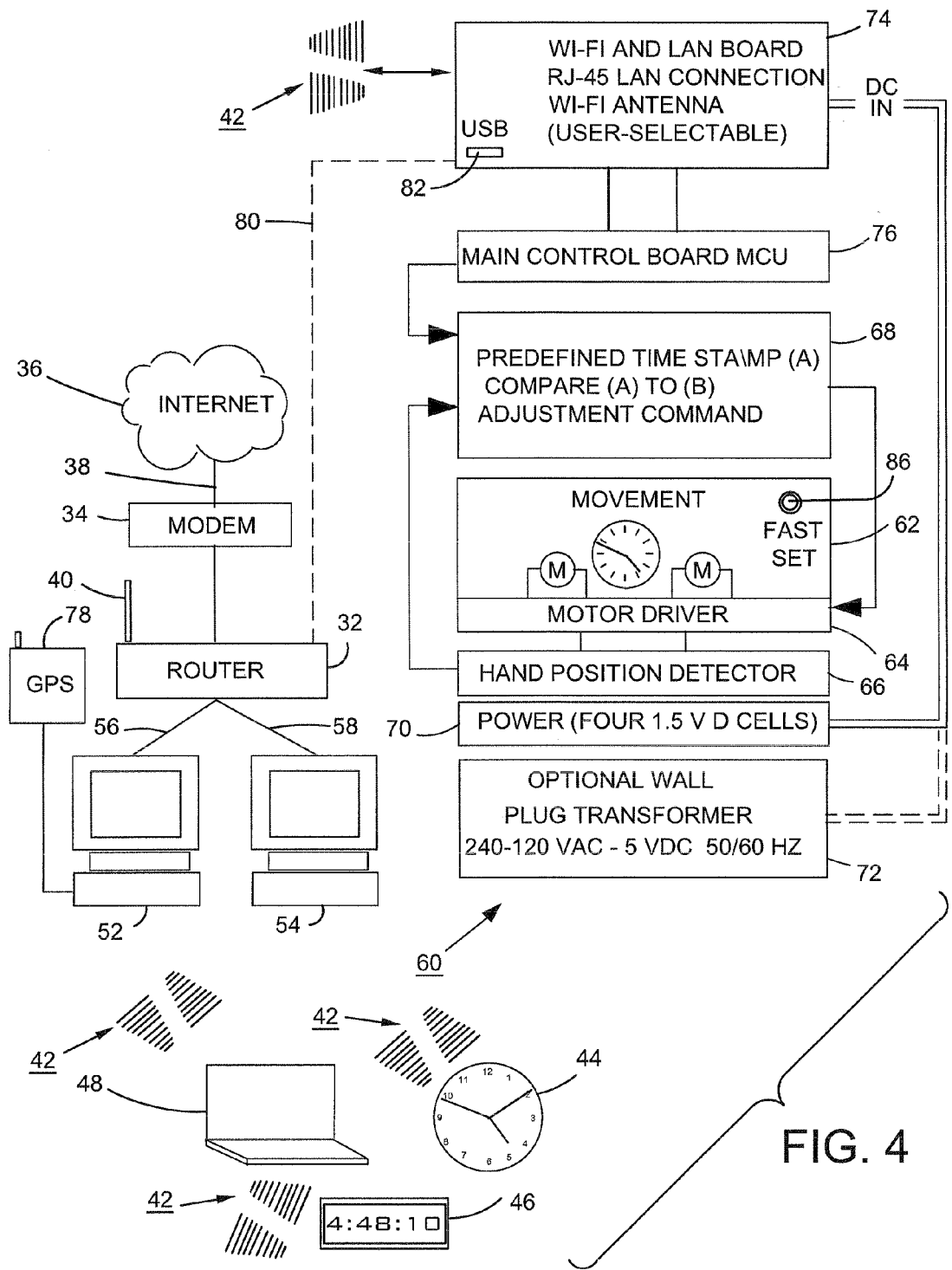
FIG. 4 is a schematic diagram of a clock synchronization system in accordance with the invention.

In the clock synchronization system shown in FIG. 4, a router 32 is connected to a modem 34, which is in turn connected to the Internet 36 or to another public wide area network, through a coaxial cable 38, optical fiber link, DSL link, or other suitable link provided by an Internet Service Provider (ISP).

An antenna 40, associated with the router, provides wireless links 42 to one or more controllable clocks, which can include one or more analog clocks 44, and one or more digital clocks 46. A computer terminal, e.g., a laptop unit 48, can also be linked to the antenna 40 through a wireless link 50.

One or more desktop terminals can also be connected to the router. In the embodiment shown, terminals 52 and 54 are connected to the router through wired links 56 and 58, respectively. Thus the clocks 44 and 46 and terminals 48, 52 and 54 are all on a local area network (LAN) which is connected to the Internet through router 32.

Although the desktop terminals are connected to the router by wired links and the clocks are connected to the router by wireless links in the embodiment shown, either type of link can be utilized for any given terminal or clock, and the choice of a wired link or a wireless link will normally depend on factors such as distance, the availability of a LAN cable and on whether or not a given clock or terminal is in a shielded or remote location from which wireless communication with the router 32 is unreliable.

A Network Time Protocol (NTP) signal is derived from the Internet 36, and distributed to the various clocks and terminals on the LAN.

Network Time Protocol, or NTP is a service provided via the Internet for synchronizing time among users at diverse locations. NTP uses a program to return a time frame, taking into account transmission delay. NTP provides a clear maximum error, allowing a user interface not only to determine the time but also to determine the accuracy of the time.

The network time protocol is depicted in FIG. 5.

LI is an indicator providing a warning in the final moment of the last day of the month. VN is a version number. The "mode" field has six possible values corresponding respectively to "reserved," "symmetric behavior," "the client," "the server," "broadcasting, and "NTP control message." The "stratum" is the overall level of the local clock identification. The "poll" is a signed integer indicating the maximum interval between successive messages. "Precision" is a signed integer indicating the accuracy of the local clock.

"Root Delay" is a signed fixed-point number corresponding to the total delay in the main reference source. "Root Dispersion" is an unsigned fixed-point number expressed relative to the normal main reference source error. "Reference Identifier" identifies a special reference to the source. "Reference timestamp" is the time at which a local clock was last set or corrected. "Originate Timestamp" is a separate client to the server, requesting the time, when using a 64 bit standard timestamp format. "Receive Timestamp" is a request to the server to reach the client's time, when using a 64 bit standard timestamp format. "Transmit Timestamp" is a separate server to the client response time, using a 64 bit time scale timestamp format. "Key identifier" and "Message digest" are optional fields, that contain the message authentication code (MAC) information when the NTP authentication scheme is implemented.

The NTP signal is translated to DCF format in hardware associated with each clock. Thus, a conventional DCF synchronized clock mechanism can be used. (GPS data can be translated to DCF format using similar manner).

Another analog clock similar to clock 44 is shown schematically at 60. The clock 60 includes a clock movement 62, a motor driver 64, a clock hand position detector 66, and a processor 68 for decoding an NTP time stamp, comparing the time stamp to the detected clock hand position, and sending an adjustment command to the motor driver 64. The unit is powered by a battery 70 of "D" cells, and can be powered optionally by a conventional wall plug transformer/rectifier unit 72 for converting line current at 240 or 120 volts AC to 6 volts DC.

The clock 66 includes a network interface 74, which can be selectably connected to the LAN either by a wired or wireless link. The network interface can be powered by battery 70 or by the wall plug unit 72. A control board 76, connected between the network interface 74 and the processor 68, translates the NTP time signal received over the LAN to DCF format, and delivers the DCF time signal to the processor 68, in which a time stamp is generated from the time signal and compared with the hand position detected by detector 66 for correction of the clock setting through the motor driver 64. The control board also enables an operator at terminal 54 to address clock 60 (and any other clock on the LAN) and modify the time stamp so that the time displayed on the clock is offset from local time by a selected number of hours in order to display the time in a selected time zone. The digital clock 46 can be synchronized with the time signal in DCF format using conventional synchronization software.

The time signal used to synchronize the clocks on the LAN can be a signal other than an NTP time signal. For example, as shown in FIG. 4, a global positioning antenna and receiver 78 can be connected to terminal 52, and a time signal based on the global positioning system (GPS) time base can be transmitted over the LAN. The user can send a control instruction, using terminal 54, to any clock on the network, to determine whether the clock is synchronized to the NTP time signal or to the GPS time signal. The GPS time signal is also translated to DCF format in the control board 76. The system can, of course, use other available time signals, including broadcast time signals such as the DCF signal, and can utilize a central antenna designed to receive the broadcast signal reliably.

Numerous modifications can be made to the clock synchronization system described. For example, the router 32 can be replaced by a hub or switch. Moreover, in each case, the LAN can be wired, wireless, or a hybrid LAN in which some of the connections can be wired and others can be wireless. An optional TCP (Transmission Control Protocol) wired LAN 80 can be used to connect one or more remote clocks such as clock 60 to the router.

As shown in FIG. 4, the network interface 74 can be provided with a USB port 82 for making direct connections from a computer terminal to clock 60. When such a connection is made software running on the computer terminal can cause the terminal to display and allow setting of time zones, security settings, daylight savings time and network values.

The clock movement can be provided with a "fast set" button 86, which can be accessible on the back of the clock. Button 86 serves as an "over the air" WiFi set button which, when a program is open on one of the computer terminals on the network, can cause the terminal to display current clock values via IP assigned to the network, and indicate and allow setting of time zones, security settings, daylight savings time and network values.

In another modification, where the LAN is wired, DC operating power for the clocks on the system can be supplied over the LAN wiring, obviating batteries and transformer/rectifier units. Many other modifications can be made to the system without departing from the scope of the invention as defined by the following claims.

What is claimed is:

1. A clock synchronization system comprising:
   a local area network;
   a receiver for receiving a publicly available standard time signal;
   a first network interface associated with said receiver for transmitting time information over the local area network;
   a clock for displaying time;
   a second network interface associated with the clock and in communication with the local area network;
   means connected to the second network interface for generating a time stamp based on time information transmitted over the local area network;
   means, responsive to the time stamp and to the time displayed on the clock, for comparing the displayed time with said time stamp and adjusting the displayed time so that the displayed time is synchronized with the standard time signal;
   at least one additional clock for displaying time, each said additional clock being associated with an additional network interface in communication with the local area network;
   means associated with each additional clock and connected to the additional network interface associated therewith for generating a time stamp based on time information transmitted over the local area network; and
   means associated with each additional clock and responsive to the time stamp generated by the time stamp-generating means associated therewith and to the time displayed thereon, for comparing the displayed time with the last-mentioned time stamp and adjusting the displayed time so that the displayed time corresponds with the standard time signal.

2. A clock synchronization system according to claim 1, in which the receiver is connected to a public wide area network and receives a publicly available standard time signal, transmitted over said public wide area network, from a source connected to said public wide area network.

3. A clock synchronization system according to claim 1, in which the receiver is tuned to receive a publicly available standard time signal transmitted by a global positioning system satellite.

4. A clock synchronization system according to claim 1, in which the local area network is a wireless local area network.

5. A clock synchronization system according to claim 1 including a user interface terminal in communication with the network through still another network interface, the user interface terminal being programmed to allow a user to adjust the hours displayed on said clocks independently, whereby the clocks can display the time in different time zones, each selected by the user.

6. A clock synchronization system according to claim 5, in which the receiver is connected to a public wide area network and receives a publicly available standard time signal from a source connected to said public wide area network.

7. A clock synchronization system according to claim 5, in which the receiver is tuned to receive a publicly available standard time signal transmitted by a global positioning system satellite.

8. A clock synchronization system according to claim 5, in which the local area network is a wireless local area network.

9. A clock synchronization system according to claim 1, in which the local area network includes at least one wireless link and at least one wired link, and in which at least one clock is connected to the local area network through a wireless link, and at least one clock is connected to the local area network through a wired link.

10. A clock synchronization system according to claim 9 including a user interface terminal in communication with the network through still another network interface, the user interface terminal being programmed to allow a user to adjust the hours displayed on said clocks independently, whereby the clocks can display the time in different time zones, each selected by the user.

11. A clock synchronization system according to claim 9, in which the receiver is connected to a public wide area network and receives a publicly available standard time signal from a source connected to said public wide area network.

12. A clock synchronization system according to claim 9, in which the receiver is tuned to receive a publicly available standard time signal transmitted by a global positioning system satellite.

\* \* \* \* \*